United States Patent Office 3,198,770
Patented Aug. 3, 1965

3,198,770
CURABLE FLUORINATED COPOLYMER COMPOSITIONS AND THE CURING THEREOF WITH CERTAIN ALKYLENIMINE DERIVATIVES
Nathaniel L. Watkins, Jr., Maplewood, Minn., assignor to Minnesota Mining and Manufacturing Company, St. Paul, Minn., a corporation of Delaware
No Drawing. Filed Apr. 4, 1960, Ser. No. 19,495
5 Claims. (Cl. 260—77.5)

This invention relates to fluorine-containing polymeric compositions and the curing thereof. In one aspect, this invention relates to the vulcanization or crosslinking of highly fluorinated polymers. In another aspect, this invention relates to the chain extension of highly fluorinated polymers. In still another aspect, this invention relates to novel cured, highly fluorinated polymers and to methods for their preparation.

As hereinafter employed, the term "curing" includes both crosslinking and chain extension, the latter indicating the interreaction of polymeric molecular chains through a terminal atom or group in the molecule and the former indicating the interreaction of polymeric molecular chains through a non-terminal atom or group in the molecule.

Highly fluorinated polymers ranging from low molecular weight liquids and waxes to high molecular weight elastomers and plastic are known. Generally such polymers are particularly outstanding for their inertness and resistance to chemical attack and thermal degradation. It is frequently desirable to effect a cure of the fluorinated polymers without adversely affecting the product properties and further without the necessity for extreme curing procedures. A relatively rapid, low temperature cure, preferably below about 200° C. and most preferably at about room temperature, has therefore been greatly desired.

Unfortunately, conventional curing agents for various non-fluorinated polymers are not necessarily suitable curing agents for the highly fluorinated polymers. Many provide no cure at all or relatively slow cures. Moreover, the conventional curing agents have other serious disadvantages, particularly as demonstrated by the appearance of undesirable properties in the cured polymer. With the low molecular weight highly fluorinated polymers, the curing agent should be capable of producing a cured product with high resistance to aging, discoloration and thermal breakdown or degradation. Liquid fluorinated polymers which can be readily cured to a clear elastomer and which display good adhession to other fluorinated polymers, such as polytetrafluoroethylene, are especially useful and have therefore been sought.

It is therefore an object of this invention to provide cured highly fluorinated polymers.

It is yet another object of this invention to provide a substantially liquid, highly fluorinated polymer composition capable of curing to a clear, transparent rubber.

A further object of this invention is to provide a substantially liquid, highly fluorinated polymer composition capable of curing and adhering to other highly fluorinated polymers, such as polytetrafluoroethylene.

Yet another object is to provide a substrate containing thereon a cured highly fluorinated polymer.

It is also an object of this invention to provide a method for readily curing highly fluorinated polymers.

It is another object of this invention to provide cured, highly fluorinated polymers having good heat, solvent and moisture resistance.

Still another object of this invention is to provide a method for curing highly fluorinated polymers, particularly liquid or low molecular weight polymers, at a low temperature, especially at room or ambient temperature, to produce elastomers.

A further object of this invention is to provide a method for crosslinking a substantially liquid highly fluorinated polymer in situ to form a solid article which is essentially rigid and tough, such as a solid rubber or elastomeric material, and which is not fluid at temperatures as high as 150° C. and higher.

According to this invention, a highly fluorinated polymer having at least about two active hydrogens per molecule, particularly in the form of carboxyl or hydroxyl groups, is admixed with an alkylenimine derivative, as hereinafter defined. This composition is then applied to a surface or is fabricated, such as by injecting the composition into a mold cavity, and thereafter is cured to form a highly fluorinated solid polymer. The curing reaction can be effected at room or ambient temperature, although higher temperatures may be employed, if desired, to accelerate the rate of cure. The preferred highly fluorinated polymers are substantially liquid below about 50° C. when devoid of volatiles (i.e. have a maximum viscosity of about 10,000 poises). Some of the higher molecular weight polymers may be liquefied or made more flowable, i.e. less viscous, by heating to a temperature of about 100° C. or by dissolving in certain selective solvents, such as chloroform, the alkyl esters of fluorocarbon monocarboxylic acids and 1,1-dihydroperfluoroalkyl alcohols and their esters (e.g. acetates and higher esters) which contain fluorocarbon chains, etc. The highly fluorinated polymer is usually maintained separate from the polyalkylenamide curing agent until the admixture is ready to be utilized. At this time, the polyalkylenamide is admixed with the fluorinated polymer and the resulting admixture is applied to the surface, cavity or mold and allowed to cure, usually at ordinary room temperature. Room temperature cures may be effected in some instances in a matter of hours, such as 24 hours. Higher temperature cures, usually not greater than about 150° C., are effected in a much shorter time, generally from a few minutes to several hours. Curing of the substantially liquid polymers is preferably effected at lower temperatures, most preferably at ambient temperature or up to about 100° C.

The highly fluorinated polymers of this invention have between about 30 and about 70 percent fluorine substitution and preferably are flowable (no volatiles present) at about room temperature. Although various highly fluorinated polymers can be employed, the vinyl addition type and the polyester type are preferred. It has been found that those highly fluorinated polymers with active hydrogen atoms in the form of hydroxyl or carboxyl groups, preferably carboxyl groups, are capable of being cured with the polyalkylenamides of this invention. The presence of carboxyl groups on the fluorinated polymer chain tends to provide the more rapid cure rate and the most effectively cured product. Such carboxyl groups may be provided by introducing a monoolefinic hydrocarbon acid, such as acrylic, methacrylic, etc.; saturated hydrocarbon polycarboxylic acid, such as adipic, succinic, diglycolic, isophthalic, sebacic, azelaic, thiadipropionic, etc.; or their fluorohalocarbon counterparts, such as the trifluorochlorodicarboxylic acids of U.S. 2,806,865 and U.S. 2,806,866, into the polymer chain. Those fluorinated polymers with only terminal carboxyl or hydroxyl groups are cured by a chain extension mechanism, whereas fluorinated polymers with carboxyl or hydroxyl groups appended elsewhere on the central carbon chain are cured by a crosslinking mechanism. In those instances in which the highly fluorinated polymer has both terminal and non-terminal carboxyl or hydroxyl groups, chain extension and crosslinking may be effected simultaneously in the presence of the polyalkylenamides of this invention.

The individual molecules of the highly fluorinated polymer must contain an average of about 2 or more free carboxyl or hydroxyl groups, preferably carboxyl groups, per molecule. The higher molecular weight normally solid fluorinated polymers having free carboxyl or hydroxyl groups can be cured in accordance with this invention, but many of the lower molecular weight highly fluorinated polymers which are liquid below about 50° C. have particularly outstanding properties and utility, such as the ability to flow readily into restricted areas and to cure therein to a clear elastomeric material of excellent thermal stability, low temperature flexibility, resistance to aromatic fuels, synthetic ester-base oils and hydraulic fluids, and retention of rubbery characteristics (as opposed to mere flexibility) at low temperatures.

By including more than two free carboxyl or hydroxyl groups per liquid fluorinated polymer chain length, a cured composition can be produced which is no longer capable of viscous flow at temperatures below about 100° C. The presence of more than about 15 free carboxyl groups in the polymer molecule tends to unduly shorten pot life or working time after the curing agent is added. The term "a cured polymer" as used herein implies that the system under discussion falls within the gelation equation concept of Flory ("The Principles of Polymer Chemistry," P. J. Flory, Cornell Press, Ithaca, New York, 1953, pages 347–367). It is preferable that the liquid (at 25 to 50° C.), highly fluorinated carboxyl containing polymers have a maximum viscosity of the order of about 10,000 poises (preferably less than 1000 poises at 25° C.), have an active hydrogen or acid content ranging from about 0.1 to about 3 milliequivalents per gram, contain an average of from about 2.5 to about 15 carboxyl groups per molecule, and have from about 30% to about 70% fluorine content.

The polyester type, highly fluorinated polymers are produced by reacting a dicarboxylic acid or the corresponding acid halide having up to about 33 carbon atoms, e.g. adipic acid, adipyl chloride, succinic acid, glutaric acid, suberic acid, azelayl chloride, sebacic acid, isophthalyl chloride, 2,4,6-trichlorononafluorosuberic acid, 3,5-bis(perfluoropropyl)-4-thiapimelyl chloride, 3-oxaglutaryl chloride, 3-perfluoropropylglutaryl chloride, 3-perfluoroheptylglutaryl chloride, 3,6-dithia-octanedioic acid, 3,5-dithia-heptanedioic acid, perfluoroadipic acid, etc., preferably an aliphatic hydrocarbon dicarboxylic acid, with an aliphatic diol, preferably a fluorinated aliphatic diol, having from 2 to about 12 carbon atoms, e.g. 2,2,3,3,4,4-hexafluoropentane diol, 2,2,3,3,4,4,5,5-octafluorohexane diol, 3,3'-oxy-bis-tetrafluoropropanol, N-ethyl perfluorooctane sulfonamido propylene glycol, etc. Fluorinated polyesters containing fluorine in the alcohol moiety are somewhat more stable to hydrolytic attack than those containing fluorine in the acid moiety. Particularly outstanding are the carboxyl terminated reaction products of an unhalogenated aliphatic dicarboxylic acid having from about 4 to about 20 carbon atoms and a fluorinated diol which is at least half fluorinated, and which has between about 2 and about 18 carbon atoms, preferably between about 3 and about 10 carbon atoms, per molecule. It appears that the hydroxyl groups of a fluorinated diol are strongly affected by the presence of fluorine on the beta carbon atom, rendering the hydrogen of the hydroxyl group more reactive with the polyalkylenamides herein disclosed.

The substantially liquid polyesters generally have an average molecular weight between about 700 and about 10,000. Examples A-C illustrate the preparation of such a polymer. If carboxyl terminated polyesters are desired, an excess of the diacid, e.g. up to about 50% molar excess as compared to the diol, is used.

EXAMPLE A

*Preparation of the diester precursors*

Ethylperfluoro-oxydipropionate having the formula $O(CF_2CF_2COOC_2H_5)_2$ is prepared from a mixture of 14.2 grams of perfluoro-oxydipropionic acid (the preparation of which is disclosed in U.S. Patent No. 2,839,513), 137 grams of ethanol and 260 grams of benzene. This mixture is heated in an apparatus equipped to remove the water-ethanol-benzene azeotrope which forms as the sterification proceeds. After removal of the azeotrope, distillation is continued to isolate the ester product, which has a vacuum boiling point of 75° C. at 3.5 mm. of pressure which is identified as ethylperfluoro-oxydipropionate.

EXAMPLE B

*Preparation of the fluorinated diol{3,3'-oxy-bis(1,1-dihydrotetrafluoropropanol)}*

About 500 ml. of tetrahydrofuran are charged to a two liter 3-necked flask fitted with a stirrer, dropping funnel and condenser. Thirty-eight grams (1.0 mol) of sodium borohydride are added and the mixture is agitated for several minutes. One hundred and eighty-one grams (0.5 mol) of ethylperfluoro-oxydipropionate are then added slowly, the rate of addition being adjusted to maintain the temperature of the reaction mixture at 45–50° C. The mixture is then agitated for approximately 1.5 hours and refluxed for an additional 2 hours (reflux temperature being approximately 67° C.). At the end of this time the mixture is cooled to room temperature and acidified with 60 ml. of 20% sulfuric acid. The reaction mixture is filtered and the two phases of the resulting filtrate are separated. The lower of these two layers is cooled and filtered and the filtrate is combined with the upper layer. This combined material is then distilled (to remove the tetrahydrofuran) until a reflux temperature of 85–87° C. is reached. The remaining material is extracted with diethyl ether which is removed by heating the mixture to 80° C. and placing it under vacuum. The remaining material is filtered to remove a small amount of crystalline precipitate and the resulting filtrate distilled in a metroware Vigreux column. A 72.2 gram middle cut of this distillation (coming off at 84–86° C. at 2 mm. of pressure) is redistilled to form a pure, water-white, viscous liquid product. This purified 3,3'-oxy-bis(tetrafluoropropanol) which is obtained in 52% of theoretical yield from the diester is found to contain 26.0% of carbon (as compared to a calculated value of 25.9%) and 54.1% of fluorine (as compared to a calculated value of 54.7%).

EXAMPLE C

*Preparation of a polyetser of adipic acid and 3,3'-oxy-bis(tetrafluoropropanol)*

The apparatus for this polyester preparation consists of a 100 ml. flask fitted with a thermometer, a gas addition tube and a water cooled condenser. 16.1803 grams (0.08842 mol) of redistilled adipoyl dichloride, a mobile liquid, and 24.5752 grams (0.08842 mol) of redistilled 3,3'-oxy-bis(tetrafluoropropanol), a viscous, water-white liquid, are charged to the flask, the latter being washed into the flask with diethyl ether. A nitrogen sweep of the reaction mixture is initiated along with a gradual warming of the reaction mixture from ambient temperature. The flow of cooling water through the condenser is not begun until all of the diethyl ether added to wash the fluorinated diol into the reaction flask has evaporated and been swept from the reaction flask. After the diethyl ether has been removed and the flow of condenser water initiated, the gradual increase in the temperature of the reaction mixture is continued, the rate being approximately 100° C. per hour. The exit stream of the nitrogen sweep is checked periodically for hydrogen chloride gas which is formed in the reaction (and the presence of which indicates that the reaction is not as yet complete). Approximately 70 minutes after initiation of the heating, the temperature of the reaction mixture has reached 150° C. and the temperature is maintained approximately at that point throughout the remainder of the reaction period. After a total reaction time of approximately 3½ hours it is observed that the exit nitrogen stream is free of hydrogen chloride. The pressure on the reaction mixture is reduced to approximately 100 mm. for a short time in order to eliminate all of the dissolved gases and the reaction is terminated. The resulting polyester is an extremely viscous liquid which does not solidify upon cooling. This material may be characterized as follows:

Number of active hydrogen atoms per molecule _____ 2
Active hydrogen content (milliequivalents per gram) _____ .408
Equivalent weight per active hydrogen _____ 2,450

The preparation of adipic acid-2,2,3,3,4,4-hexafluoropentane diol and adipic acid-2,2,3,3,4,4,5,5-octafluorohexanediol polyesters is achieved in a similar fashion.

The following example illustrates the preparation of still another fluorinated polyester.

EXAMPLE D

To a 2 liter three-necked flask was added

| | Grams |
|---|---|
| $C_8F_{17}SO_2NHC_2H_5$ | 408 |
| Ethylene glycol | 450 |
| 24.5% $NaOCH_3/CH_3OH$ | 184 | and the mixture was heated to 100° C. at 15 mm. vacuum for one hour, then cooled to 50° C. 95 grams of α-chloro glycerolhydrin ($ClCH_2CHOHCH_2OH$) and 5 grams of $NaHCO_3$ was added and the resultant mixture was heated with stirring to 120° C. for 8 hours. After cooling a small amount of water was added to facilitate phase separation. The bottom phase was removed and distilled at 180° C./2–3 mm. to collect 350 grams of $$C_8F_{17}SO_2N(C_2H_5)CH_2CHOHCH_2OH$$

Using a 250 ml. two necked flask equipped with stirrer, Barrett trap and reflux condenser the following were added:

| | | |
|---|---|---|
| 0.150 eq. isosebacic acid | grams | 15.2 |
| 0.125 eq. $C_8F_{17}SO_2N(C_2H_5)CH_2CHOHC_2OH$ | do | 38.6 |
| .001 eq. trimethylol propane | do | 0.4 |
| Toluene | cc | 20 |

After filling the trap with toluene, the mixture was stirred and heated slowly to 200° C., and water was removed azeotropically. Thereafter it was cooled, evacuated to 15 mm., reheated to 200° C., cooled, and the polymeric product recovered.

The curing of these linear, highly fluorinated polyesters is accomplished primarily by a chain extension mechanism. Branched polyesters which have a high degree of fluorine substitution and which may also be crosslinked may be prepared by introducing a polyfunctional alcohol, such as glycerol, trimethylolpropane, mannitol, pentaerythritol, etc., or a polyfunctional acid, such as trimesic acid, citric acid, benzene tetracarboxylic acid, etc., into the polymer chain. Many other polyesters of a highly fluorinated type which contain the requisite carboxyl or hydroxyl groups will be apparent to those skilled in the art.

The polyvinyl type polymers are produced by reacting an alpha-beta unsaturated carboxylic acid, such as acrylic, crotonic, methacrylic acid, etc., with one or more aliphatic, at least half fluorinated terminally unsaturated mono- or di-olefinic compounds, such as tetrafluoroethylene, trifluorochloroethylene, vinylidene fluoride, perfluoropropene, 1,1-dihydroperfluorobutyl acrylate, 1,1,3-trifluorobutadiene, 3 - perfluoromethoxy-1,1-dihydroperfluoropropyl acrylate, etc., preferably fluorinated monoolefins having less than about 10 carbon atoms. These polymers may be cured by a crosslinking reaction. The substantially liquid vinyl type polymers have a molecular weight range below about 50,000. Illustrative of these polyvinyl type polymers are the copolymer of 1,1-dihydroperfluorobutyl acrylate and acrylic acid, the copolymer of 3-perfluoromethoxy-1,1-dihydroperfluoropropyl acrylate and acrylic acid, and the terpolymer of perfluoropropene, acrylic acid and vinylidene fluoride. U.S. Patents Nos. 2,642,416, 2,803,615, 2,826,564 and 2,839,513 disclose a method for preparing the above-mentioned and other fluorinated acrylates and polymers thereof. U.S. Serial No. 796,275, filed March 2, 1959, shows a method for preparing the terpolymer of perfluoropropene, vinylidene fluoride, and an alpha-beta unsaturated carboxylic acid, which includes the polymerization of between about 15 and about 50 mol percent of perfluoropropene, between about 50 and about 85 mol percent of vinylidene fluoride, and between about 0.1 and about 10 mol percent of an alpha-beta unsaturated monocarboxylic acid at a temperature between about 50° C. and 200° C. in the presence of a chain transfer agent, such as carbon tetrachloride or dodecyl mercaptan. An example of the preparation of such a terpolymer follows.

EXAMPLE E

Vinylidene fluoride, perfluoropropene and acrylic acid were polymerized together at a temperature of about 60° C. for 16½ hours in a mol ratio corresponding to about 70:30:2, respectively. The polymerization recipe included the following:

1 gram of vinylidene fluoride
1 gram of perfluoropropene
0.032 gram of acrylic acid
0.10 gram of potassium persulfate
.02 gram of perfluorooctanoic acid
.06 gram of carbon tetrachloride
4 grams of water The polymer obtained was a low molecular weight terpolymer capable of being readily dissolved in acetone and having a viscosity [η] of 0.049, corresponding to an average molecular weight of about 5,000. The conversion was about 75 percent. The polymer softens and strings at 40° C. and is completely fluid at 50° C.

The curing agents employed in this invention are alkylenimine derivatives of the formula

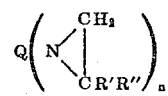

where Q is an $n$ valent radical, $n$ is 2 or more (preferably 2 or 3), N is linked to an atom having a valence of 4 or 5, and R' and R'' are hydrogen or an alkyl group preferably having from 1 to 4 carbon atoms. Q may be an aliphatic, aromatic or alicyclic organic radical which does not contain an acitve hydrogen but which may contain atoms other than carbon, such as oxygen, sulfur, etc. Q may also be an inorganic radical, such as

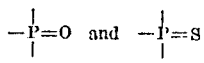

In the preferred curing agents Q is selected form the groups consisting of

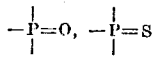

and

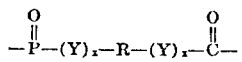

wherein Y is either O or —NH—, $n$ is 2 or 3, $x$ is either 0 or 1, and R is a divalent aliphatic, aromatic or alicyclic radical which may contain atoms other than carbon, e.g. oxygen, sulfur, etc.

The phosphorus containing alkylenimine derivatives include, for example, tris(1-aziridinyl) phosphine oxide, tris(1-aziridinyl) phosphine sulfide, N,N-diethyl-N',N''-diethylenethiophosphoramide, N,N' - diethylenbenzene thiophosphondiamide, N-(3-oxapentamethylene) - N',N''-diethylene phosphoric triamide, N,N'-diethylene benzene phosphondiamide, N,N'-diethylene ethane phosphondiamide, butyl N,N'-diethylenediamidophosphate, N,N-dioctyl - N',N''-diethylenephosphoric triamide, N,N',N''-tris(1,1-dimethylethylene)phosphoric triamide, etc.

The carbonyl containing curing agents which are particularly preferred have the formula

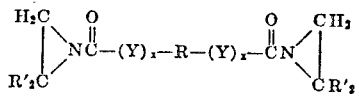

wherein Y is either oxygen or —NH—, $x$ is either 0 or 1, R' is hydrogen or a lower alkyl group (i.e. a hydrocarbon radical having from 1 to 4 carbon atoms), and R is a divalent aliphatic, aromatic or alicyclic radical. R may contain atoms other than carbon, such as oxygen and sulfur, but does not contain an active hydrogen, i.e. a hydrogen which is active to the Zerewitinoff test (inert to Grignard reagents). When $x$ is 0, the compound is a bis-1,2-alkylenamide. When Y is O and $x$ is 1, the compound is a bis-1,2-alkylene carbamate. When Y is —NH— and $x$ is 1, the compound is a bis-1,2-alkylene urea, such as 1,6-hexamethylene N,N'-diethylene urea.

Bis-1,2-alkylene carbamates and their preparation are described in U.S. Serial No. 850,541, filed November 3, 1959. Generally, their preparation involves the reaction of a 1,2-alkylenimine in a water phase with a solution of a chlorocarbonate of a difunctional alcohol in a water immiscible organic solvent, in the presence of an acid acceptor, at a temperature between about —5° C. and 30° C. The following Example F illustrates the preparation.

EXAMPLE F

A 250 ml. three necked flask was equipped with a stirrer, thermometer, condenser and dropping funnnel. To the flask was added a solution of 41.5 g. (0.3 mol) of potassium carbonate in 50 ml. of water, followed by 9.0 g. (0.21 mol) of ethylenimine. This mixture was stirred and cooled to 10° C. A solution composed of 27.5 g. (0.1 mol) of triethylene glycol bis chlorocarbonate in 100 ml. of benzene was then added dropwise to the flask with stirring and cooling over a period of about 18 minutes. The mixture was kept at 10–12° C. during the addition and was allowed to warm to room temperature after the addition had been completed. Stirring was continued for an additional hour. The benzene layer was recovered, dried over a molecular sieve, filtered and evaporated to constant weight under vacuum. 28 g. of a water-white liquid product (which was identified as N,N'-bis-1,2-ethylene (triethylene glycol) carbamate) were obtained, corresponding to a 99% yield thereof. The refractive index ($n_D^{25}$) of this product was 1.4748 and its density ($d_4^{23°}$) was 1.198. Upon analysis, this product was found to contain 9.74% of nitrogen and 0.1% chlorine as compared to calculated values of 9.73% and 0.0% respectively. It is also soluble in a 1:1 weight ratio with water, methanol, isopropanol, methyl ethyl ketone, ethyl Cellosolve, butyl acetate and toluene.

Illustrative of the bis-carbamates which are useful as curing agents in the present invention are:

N,N'-bis-1,2-ethylene (1,4-butanediol) carbamate;
N,N'-bis-1,2-propylene (1,4-butanediol) carbamate;
N,N'-bis-1,2-butylene (1,4-butanediol) carbamate;
N,N'-bis-1,2-ethylene (diethylene glycol) carbamate;
N,N'-bis-1,2-butylene (diethylene glycol) carbamate;
N,N'-bis-1,2-ethylene (triethylene glycol) carbamate;
N,N'-bis-1,2-propylene (triethylene glycol) carbamate;
N,N'-bis-1,2-butylene (triethylene glycol) carbamate;
N,N'-bis-1,2-ethylene (polyethylene glycol-200) carbamate;
N,N'-bis-1,2-ethylene (polyethylene glycol-400) carbamate;
N,N'-bis-1,2-ethylene (polyethylene glycol-1000) carbamate;
N,N'-bis-1,2-propylene (polyethylene glycol-1000) carbamate;
N,N'-bis-1,2-ethylene (polyethylene glycol-4000) carbamate;
N,N'-bis-1,2-ethylene (polypropylene glycol-1025) carbamate;
N,N'-bis-1,2-ethylene (polybutylene glycol-500) carbamate;
N,N'-bis-1,2-ethylene [1,1'-isopropylidenebis (p-cyclohexanol)] carbamate;
N,N'-bis-1,2-ethylene [1,1'-isopropylidenebis (p-phenyleneoxy) di-2-propanol] carbamate;
N,N'-bis-1,2-ethylene phenylenoxydiocetamide;
N,N'-bis-1,2-ethylene phenylenoxy carbamate;
N,N'-bis-1,2-ethylene-4,4'-bisphenyl carbamate;
N,N'-bis-1,2-ethylene (1,1'-isopropylidene-bis-phenylene) carbamate;
N,N'-bis-ethylene-resorcinol carbamate, etc.

The preferred aromatic carbamates are represented by the above formula wherein R is 1,3-phenylene, 1,4-phenylene, 1,1'-isopropylidene-bis-phenylene, or 1,1'-isopropylidene bis (p-phenyleneoxy) di-2-propanol. The preferred aliphatic carbomates are represented by the above formula wherein R is a branched or straight chain alkylene radical having from about 4 to about 40, preferably from about 4 to about 20, carbon atoms.

Bis-1,2-alkylenamides and their preparation are described in U.S. Serial No. 832,152 (filed August 7, 1959), Serial No. 840,255 (filed September 16, 1959), and Serial No. 850,330 (filed November 2, 1959). Generally, their preparation involves the reaction of an alkylenimine in an aqueous phase with a solution of a dicarboxylic acid halide in a water immiscible organic solvent in the presence of an acid acceptor at a temperature between about —5° C. and 30° C. Illustrative of the N,N'-bis-1,2-alkylenamides in accordance with this invention are N,N'-bis-1,2-ethylenadipamide;
N,N'-bis-ethylenpentadecyladipamide;
N,N'-bis-1,2-butylenadipamide;
N,N'-bis-1,2-ethylenepimelamide;
N,N'-bis-ethylene thiodipropionamide;
N,N'-bis-ethylene oxydipropionamide;
N,N'-bis-1,2-ethyleneisosebacamide;
N,N'-bis-1,2-butylenisosebacamide;
N,N'-bis-1,2-ethylensebacamide;
N,N'-bis-1,2-ethylensuberamide;
N,N'-bis-1,2-propylensuberamide;
N,N'-bis-1,2-butylensuberamide;
N,N'-bis-1,2-ethylenazelaamide;
N,N'-bis-1,2-propylenazelaamide;
N,N'-bis-1,2-butylenazelaamide;
N,N'-bis-1,2-ethylendodecanoyldicarboxylic acid amide;

N,N'-bis-1,2-ethylentetradecanoyldicarboxylic acid amide;
N,N'-bis-1,2-proplyentetradecanoyldicarboxylic acid amide;
N,N'-bis-1,2-ethylenhexadecanoyldicarboxylic acid amide;
N,N'-bis-1,2-ethylenoctadecanoyldicarboxylic acid amide;
N,N'-bis-1,2-propylenoctadecanoyldicarboxylic acid amide;
N,N'-bis-1,2-propylendecanoyldicarboxylic acid amide;
N,N'-bis-1,2-pentylensebacamide;
N,N'-bis-1,2-ethylene monadecanediamide;
N,N'-bis-1,2-ethylene-1,4-naphthalenedicarboxamide;
N,N'-bis-1,2-propylene-1,4-naphthalenedicarboxamide;
N,N'-bis-1,2-ethylene-4,4'-bis-phenyl dicarboxamide;
N,N'-bis-1,2-propylene-4,4'-biphenyl dicarboxamide;
N,N'-bis-1,2-ethylene hexahydroterephthalamide;
para-(N-1,2-ethylene carboxamidophenyl)-N-1,2-ethylene acetamide;
N,N'-bis-1,2-ethylene isophthalamide;
N,N'-bis-1,1-dimethylethylene isophthalamide;
N,N'-bis-1,2-butylene isophthalamide;
N,N'-bis-1,2-ethylene hexahydroisophthalamide; etc.

The preferred aliphatic bis-1,2-alkylenamides are represented by the above formula wherein R is a branched or straight chain alkylene radical having from about 4 to about 40, preferably from about 2 to about 20, carbon atoms. The preferred aromatic bis-1,2-alkylenamides are represented by the above formula wherein R is 1,3-phenylene, 1,4-phenylene, 1,4-naphthalene, or 4,4'-bis-phenyl. The following Example G illustrates the preparation.

EXAMPLE G

N,N'-bis-ethylene isosebacamide is prepared by the reaction of ethylenimine with isosebacoyl dichloride to produce the desired substantially pure monomer, with hydrogen chloride as a by-product. Specifically, it may be prepared as follows: A solution of about 95.6 parts of isosebacoyl dichloride prepared from isosebacic acid dissolved in 400 parts of diethyl ether is added dropwise with cooling and vigorous stirring to a flask containing a solution of 110 parts of potassium carbonate and 43 parts of ethylenimine in 800 parts of water. The temperature of the mixture is maintained below 15° C. and the acid chloride is added at a rate of approximately 1 part per minute. The reaction mixture is allowed to warm gradually to room temperature, while stirring, for an additional hour. During the total reaction period, the pH of the reaction mixture has dropped from approximately 12.5 at the beginning of the reaction to about 8.6 at the end. The ether layer is separated, dried over solid anhydrous sodium hydroxide at 0° C. for 1 hour, the sodium hydroxide is removed by filtration and the ether removed from the filtrate under reduced pressure. The resulting reaction product, N,N'-bis-1,2-ethyleneisosebacamide, remains as a water-white liquid.

The amount of curing agent utilized in this system should be sufficient to complete the curing of the curable fluorinated polymers. Usually an excess stoichiometric equivalent of the curing agent to the curable polymers is utilized, and this amount, of course, depends upon the number of carboxyl or hydroxyl sites on the curable polymers. It is often preferred to use as much as 20 percent stoichiometric excess of the curing agent, and such excess can be as much as 70 percent. It is also possible to employ more than one curing agent in curing a fluorinated polymer or mixture of fluorinated polymers of this invention, particularly where modification of the cure rate or cured polymer properties is desired. Although a variety of cured products can be produced in accordance with this invention, the curing of the substantially liquid fluorinated polymers, particularly the polyesters, to form a clear flexible or elastomeric material of outstanding properties as herein described is preferred.

These curable compositions may also contain, if desired, an inorganic heat stable pigment, such as titanium dioxide, ferric oxide, etc., a reinforcing agent, such as carbon black, certain fine silicas, etc., and various antioxidants, such as sym-di-beta-naphthyl-paraphenylenediamine and diphenyl p-phenylene diamine. Dyes, fillers and coloring pigments may also be incorporated into the curable composition.

When the curable compositions of this invention are used to provide a protective coating, they may be coated onto such surfaces as textile fabrics (e.g. nylon, fiberglass, polyacrylonitrile, ethylene glycol-terephthalic acid copolymer, acrylic copolymer, cotton, etc.), metals (e.g. copper, aluminum, steel, etc.), glass or other ceramics, synthetic resins (including the halogenated resins, e.g. polytetrafluoroethylene, etc.), wood, leather, paper, synthetic rubber and cork. It may also be used to impregnate the surface when a porous material is used, such as paper, textile fibers, and leather. Impregnation is aided by the use of a suitable solvent.

These curable compositions are readily adaptable for injection into grooves surrounding the fuel cavity of many aircraft fuel tank designs, to insure a leakproof and temperature resistant seal against hydrocarbon jet fuels as well as vapor pressure developed in the tank resulting from aerodynamic heating during flight. The cured sealant compositions of this invention are inert and resist degradation by hydrocarbon fuels and long term high temperature exposure. Other uses as aircraft sealants include use in pressurized cabins, and as gaskets, valve diaphragms and O-rings, and as an interlining or edge sealer for laminated windshields. They provide an excellent adhesive for highly fluorinated polymers, such as Teflon.

The following examples are offered as illustrative of the invention and of the compositions and methods described herein. To avoid unnecessary repetition, the examples have been selected to represent illustrative embodiments of the invention and the bis-1,2-alkylenamides and fluorinated polymers set forth therein, have been selected to represent illustrative embodiments of the invention and are not to be considered as necessarily limiting the scope of the invention.

In the following examples $[\eta]$ is equal to $$\frac{\ln \frac{\eta \text{ solution}}{\eta \text{ solvent}}}{C}$$

where C is the concentration of polymer in grams per 100 ml. of solution, and $\eta$ solution and $\eta$ solvent are viscosities in consistent units.

EXAMPLE 1

A linear, tacky, viscous, liquid fluorinated polymer was prepared by reacting equimolar proportions of 3,3'-oxy-bis-tetrafluoropropanol and adipic acid, the polymer having a neutralization equivalent of 4900 and a 41% fluorine content. A portion of this fluroinated polymer (0.980 gram) was dissolved in 6 ml. of chloroform, and 0.0672 gram of N,N'-bisethylene isosebacamide (25% excess over theoretical) was added at room temperature in an aluminum cup. The solution was evaporated slowly, and the polymer deposited as a film in the cup. This film was cured for 1¾ hours at 120° C. to produce a tack-free solid rubber (0.8 gram). This rubber was milled with 0.04 gram of dicumyl peroxide and cured at 310° F. for 30 minutes to form a snappy rubber with good solvent resistance.

Isosebacic acid, of which the above isosebacamide is a derivative, consists of 72–80% of 2-ethylsuberic acid, 12–18% of 2,4-diethyladipic acid and 6–10% of n-sebacic acid.

EXAMPLE 2

Using the fluorinated polyester of Example 1, 5.16 grams of polymer were combined with 0.282 gram of N,N'-bisethylene isosebacamide, and the dried film was cured at 120° C. for 75 minutes. A crosslinked rubber was produced which could not be dissolved in chloroform even after a 10 day immersion at room temperature. Physical properties were as follows:

Tensile strength _____ p.s.i__ 66
Elongation _____ percent__ 180
Set at break _____ do____ 0
Gehman $T_{10}$ (ASTM D1053–54T) _____ ° F__ −40
Brittle point _____ ° F__ −72
Volume swell at 25° C. in Type B fuel (ASTM D471—55%) _____ percent__ 30

EXAMPLE 3

A fluorinated polyester was prepared by reacting 0.90 gram trimethylol propane, 40 grams hexafluoropentane diol and 25.4 grams adipic acid (acid number 49.4; 35.4% fluorine content, active hydrogen meq./gm KOH 0.88, equivalent weight 1138). Four grams of this polyester were combined with 5.8 grams of N,N'-bisethylene isosebacamide, and the mixture was cured for 72 hours at 250° F. A tack-free, soft elastomer was formed.

B. After additional cure cycle of 117 hours at 500° F.—
   Weight loss_____ 5.0%.
   Appearance _____ Darkened, bubbled, flexible.
   Adherence to stainless steel_____ Adhesion lost.

C. After additional cure cycle of 72 hours at 180° F. submerged in 70% isooctane: 30% toluene—
   Percent volume swelling _____ 1.6%.
   Adherence to stainless steel _____ Good.

EXAMPLES 7–10

The following Table I is a comparison of several bis-amides as curatives in the FBA:acrylic acid system. A medium molecular weight FBA:acrylic acid (98.73:1.25) copolymer (51.7% fluorine) was used and an equivalent amount of bis-amide, i.e. 1 cyclic imine ring per carboxyl group, was added. No reinforcing fillers were used. The resin mixtures were cured for at least seven days at room temperature before evaluation.

TABLE I

| Example | | Original Properties | | | 100 hrs./350° F./air Aged properties | | | Volume Swelling | |
|---|---|---|---|---|---|---|---|---|---|
| | | Tensile, p.s.i. | Elongation, Percent | Set | Tensile, p.s.i. | Elongation, Percent | Weight Loss, Percent | 70/30 Fuel, 48 hrs. at 140° F.[1] | Water 70 hrs. at 212° F. |
| 7 | N,N'-bis-ethylenisosebacamide | 20 | 80 | 0 | 32 | 80 | 11.0 | 32 | 7 |
| 8 | N,N'-bis-ethylensebacamide | 34 | 100 | 0 | 64 | 90 | 11.8 | 24 | 14 |
| 9 | N,N'-bis-ethylenisophthalamide | 30 | 190 | 0 | 40 | 130 | 10.2 | 1 | 1 |
| 10 | N,N'-bis-2-ethylethylenisophthalamide | 11 | 300 | 0 | 56 | 80 | 13.8 | 1 | 1 |

[1] ASTM D 471-55T.

EXAMPLE 4

One hundred parts of a liquid copolymer ([η] or intrinsic viscosity of .07 in xylene hexafluoride) of 99% by weight 1,1-dihydroperfluorobutylacrylate and 1% by weight of acrylic acid (51.8% fluorine, prepared in bulk using dodecyl mercaptan as a regulator) were mixed with 6 parts by weight of N,N'-bis-ethylene sebacamide. The mixture was poured into an open steel mold and allowed to cure for 24 hours at room temperature. A tacky, rubbery solid was formed which could be removed from the mold and exhibited no cold flow on standing. The solid is not rendered thermoplastic by heating to 350° F. and is insoluble in xylene hexafluoride.

EXAMPLE 5

A liquid copolymer is prepared in bulk from 1,1-dihydroperfluorobutyl acrylate and acrylic acid as in Example 4. The clear, viscous liquid is compounded with reinforcing agents, i.e. Philblack O (carbon black) in one instance and silica in another, and an amount of N,N'-bisethylene isosebacamide equivalent to the acid content of the copolymer is added. After standing 48 hours in an open mold at ambient temperature, a solid tack-free rubber is formed which has excellent solvent and heat resistance.

EXAMPLE 6

A terpolymer of 58 parts by weight of perfluoropropene, 4 parts by weight of acrylic acid and 38 parts by weight of vinylidene fluoride (63.4% fluorine) was prepared. The intrinsic viscosity (taken using acetone as the solvent) was 0.030.

Nine parts by weight of N,N'-bisethylene isosebacamide were mixed thoroughly into the terpolymer and the mixture was poured onto 17–7 stainless steel panels and cured for 4 hours at 250° F. The elastomer sheet was divided into 3 portions, A, B, and C. Evaluation:

A. After additional cure cycle of 119 hours at 400° F.—
   Weight loss _____ 1.1%.
   Appearance _____ Little change.
   Adherence to stainless steel _____ Good.

EXAMPLE 11

Ten grams of a liquid copolymer of 1,1-dihydroperfluorobutyl acrylate, $CH_2CHCOOCH_2C_4F_9$, and acrylic acid (98¾:1¼ mol ratio), having a bulk viscosity of 13,500 poises and an intrinsic viscosity of .074 in xylene hexafluoride was mixed thoroughly with 0.292 gram of N,N'-bis-ethylene isosebacamide. After curing overnight at room temperature an elastomer gel formed which further cured to a tack free elastomer in about 5 days. After two weeks its physical properties were determined as shown in Table II.

EXAMPLE 12

Ten grams of the liquid copolymer of Example 11 were combined with 0.250 gram of N,N'-bis-ethylene isophthalamide. After about 5 days at room temperature, the elastomer had the properties appearing in Table II, the solvent resistance and water resistance being particularly outstanding.

EXAMPLE 13

Ten grams of the liquid copolymer of Example 11 were admixed with 0.315 gram of N,N'-bis-1,2-butylene isophthalamide. After about 5 days at room temperature the resultant elastomer displayed the properties indicated in Table II. The excellent fuel and water resistance are especially noteworthy.

EXAMPLE 14

Ten grams of a liquid copolymer of 3-perfluoromethoxy-1,1-dihydroperfluoropropyl acrylate, $$CH_2=CHCOOCH_2CF_2CF_2OCF_3$$

and acrylic acid (99:1 mol ratio) having a bulk viscosity of 1,370 poises, a fluorine content of 49.2%, and an intrinsic viscosity of 0.06 in xylene hexafluoride were admixed with 0.292 gram of N,N'-bis-ethylene isosebacamide and 1.5 grams of Philblack A (carbon black). After curing for about 5 days at room temperature the rubber had the properties appearing in Table II. The low temperature flexibility of this rubber is exceptionally good.

EXAMPLE 15

Ten grams of the liquid polymer of Example 11 were thoroughly mixed with 0.292 gram of N,N'-bis-ethylene sebacamide and allowed to cure for about 5 days at room temperature. Properties appear in Table II.

EXAMPLE 16

A reinforced elastomer was prepared by adding 15 parts by weight of Philblack A (a very fine, high-abrasion furnace black) to the recipe of Example II and curing in similar fashion. The tensile properties of the elastomer were increased to approximately six times the value of the Example 11 elastomer, as shown in Table II.

EXAMPLE 17

Ten grams of a liquid copolymer of 1,1-dihydroperfluorobutyl acrylate and acrylic acid (99:1 mol ratio) having a fluorine content of 51.8% were admixed with 0.320 gram of N,N'-bis-ethylene diethylene glycol carbamate and cured at room temperature for about 5 days. As shown in Table II, the weight loss during heat aging cycle was exceptionally low, indicating a high order of stability in the system.

EXAMPLE 18

Ten grams of the liquid copolymer of Example 17 were admixed with 0.20 gram of 1,6-hexamethylene diethylene urea (96% pure) and cured at room temperature for about 5 days. As shown in Table II, this cured elastomer displayed excellent resistance to the swelling action of water.

mill and cured for 1 hour at 310° F. The resulting rubber was smooth and uniform and free of bubbles and surface bloom. Physical properties were as follows:

Tensile strength _____ p.s.i__ 615
Elongation _____ percent__ 500
Break set _____ do____ 25

To illustrate further the outstanding results achieved in curing highly fluorinated polymers of this invention with the alkylenimine derivatives earlier described, Tables III and IV set forth properties of the highly fluorinated polyester type and the highly fluorinated polyvinyl type polymer when cured with conventional curing agents and with the alkylenimine derivatives herein described. In all instances approximate stoichiometric mixtures were prepared and cured under the conditions indicated. The curing agents employed are identified as follows:

(A) Triethylene tetramine (TETA).
(B) Shell Epoxy 828, a reaction product of 1 mol bisphenol A and 2 mols epichlorohydrin, M.W.$_{av}$=355, epoxy eq.=45 eq. per 100 grams, hydroxyl eq.=.08 eq. per 100 grams.
(C) Dianisidine diisocyanate (DADI).
(D) Dicumyl peroxide ("Dicup").
(E) Thiokol liquid polymer LP-3, 98 mol percent dichloroethyl formal, 2 mol percent trichloropropane, reacted with sodium polysulfide; M.W. of 1000, eq. wt.=467; 0.14 branch per mol.
(F) N,N'-bis-1,2-ethylene (1,4-butane diol) carbamate

TABLE II.—ELASTOMER PHYSICAL PROPERTIES

| Example | Original Properties | | | | | Properties After Heat Aging (100 hrs. at 350° F.) | | |
|---|---|---|---|---|---|---|---|---|
| | Brittle Point, ° F. | Tensile Strength, p.s.i. | Elongation, percent | Volume Swell, percent | | Tensile Strength | Elongation, percent | Weight Loss, percent |
| | | | | 70/30 Fuel, 48 hrs./ 140° F. | Water, 70 hrs./ 212° F | | | |
| 11 | +22 | 19 | 80 | 32 | 7 | 32 | 80 | 11 |
| 12 | +25 | 31 | 190 | 1 | 1 | 39 | 130 | 10 |
| 13 | +23 | 9 | 300 | 1 | 1 | 56 | 80 | 14 |
| 14 | -22 | 86 | 60 | 24 | 11 | 83 | 80 | 9 |
| 15 | +20 | 34 | 100 | 24 | 14 | 64 | 90 | 12 |
| 16 | +23 | 118 | 70 | 19 | 0 | 181 | 90 | 9 |
| 17 | +15 | 30 | 100 | 32 | 7 | 32 | 80 | 5 |
| 18 | +23 | 35 | 130 | 32 | 0 | 64 | 50 | 12 |

EXAMPLE 19

One hundred parts of a high molecular weight solid copolymer of 99.6 weight percent 1,1-dihydroperfluorobutyl acrylate and 0.4 weight percent acrylic acid were milled with 25 parts by weight of Philblack O and 3 parts by weight of N,N'-bis-ethylene sebacamide. The mixture was milled on a cool rubber mill and cured for 1 hour at 310° F. The resultant rubber had the following properties:

Tensile strength _____ p.s.i__ 445
Elongation _____ percent__ 640
Break set _____ do____ 50

EXAMPLE 20

A high molecular weight ($\overline{M}_v$>1,000,000) solid copolymer of 99.6% by weight of 1,1-dihydroperfluorobutyl acrylate and 0.4% by weight of acrylic acid was milled with 25 parts (per 100 parts of rubber) of Philblack O and 5 parts (per 100 parts of rubber) of N,N'-bis-ethylene sebacamide. The mixture was milled on a cool rubber (G) 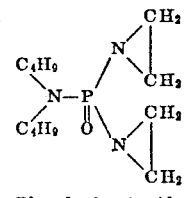

Phosphoric triamide (H) 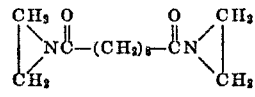

(I) 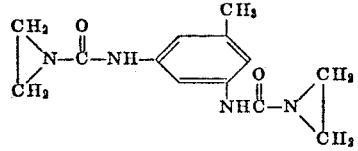

(J) 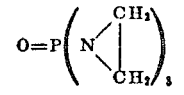

TABLE III.—FLUORINATED POLYESTER CURES

| Fluorinated Polyester of + → Example D | Ex. 21 A TETA | Ex. 22 B Epoxy 828 | Ex. 23 C DADI | Ex. 24 D Dicup | Ex. 25 E LP-3 |
|---|---|---|---|---|---|
| Initial Appearance | Clear, light yellow compatible. | Clear, compatible. | Clear, white, insoluble parts of DADI, incompatible. | Black (contains carbon black). | White, compatible. |
| Room temperature cure (2 days). | Good | Appreciable | Some | No cure | No cure. |
| Cured at 150° C. for 2 hours. | Fairly good cure | Fairly good cure | Poor cure | No observable cure | Poor cure. |
| Appearance | Discolored very badly. | Clear, compatible, transparent. | Discolored, incompatible. | Black | Opaque, incompatible. |
| Adhesion test to Teflon | Poor adhesion, shocks off readily. | Poor in adhesive strength. | Not aggressive | Very weak adhesive | Very weak adhesive. |
| Time to failure on overlap bond to aircraft aluminum. | | 60 min | | | |
| Aging: | | | | | |
| Time | 2 hours | 2 hours | 2 hours | 2 hours | 2 hours. |
| Temperature | 150° C | 150° C | 150° C | 150° C | 150° C. |
| Appearance after aging | Brown | Clear, slight transparent. | Brown | Black | Opaque. |

| Fluorinated Polyester of + → Example D | Ex. 26 F Butane Diol Carbamate | Ex. 27 G Phosphoric Triamide | Ex. 28 H Bis-amide | Ex. 29 I Dialkylene Urea |
|---|---|---|---|---|
| Initial Appearance | Clear, compatible | Clear, compatible | Clear, compatible | Clear, compatible. |
| Room temperature cure (2 days). | No cure | Appreciable | Appreciable | Appreciable. |
| Cured at 150° C. for 2 hours. | Good cure | Good cure | Good cure | Good cure. |
| Appearance | Light yellow, clear, compatible, fairly strong film, transparent. | Light yellow, clear, compatible, medium film, transparent. | Light yellow, clear compatible, fairly strong film, transparent. | Clear, transparent film. |
| Adhesion test to Teflon | Very good adhesive | Very good adhesive | Very good adhesive | |
| Time to failure on overlap bond to aircraft aluminum. | 82 minutes | Several days | Several days | |
| Aging: | | | | |
| Time | 2 hours | 2 hours | 2 hours | |
| Temperature | 150° C | 150° C | 150° C | |
| Appearance after aging | Clear, slightly yellow, transparent. | Clear, slightly yellow, transparent. | Clear, slightly yellow, transparent. | No discoloration, excellent interlayer material. |

TABLE IV.—FLUORINATED POLYVINYL POLYMER CURES

| Fluorinated Polyvinyl Polymer + → of Example 11 | Ex. 30 A TETA | Ex. 31 B Epoxy 828 | Ex. 32 C DADI | Ex. 33 D Dicup | Ex. 34 E LP-3 |
|---|---|---|---|---|---|
| Initial appearance | Clear, compatible | White, incompatible | Clear, insoluble parts of DADI, incompatible. | Black (contains carbon black). | White, incompatible. |
| Room temperature cure (2 days). | Yes | No | Some | No | No. |
| Cured at 50° C. for 16 hours. | Good cure | Poor cure | Poor cure | Very poor cure | Poor cure. |
| Appearance | Clear, compatible, but yellowed. | Opaque, incompatible. | Opaque, incompatible. (All poor cures; not checked for adhesion) | Black | Opaque, incompatible. (All poor cures; not checked for adhesion) |
| Adhesion test to Teflon coated cloth. | Poor adhesion, shocked off. | | | | |
| Aging: | | | | | |
| Time | 16 hours | 16 hours | 16 hours | 16 hours | 16 hours. |
| Temperature | 50° C | 50° C | 50° C | 50° C | 50° C. |
| Appearance after aging | Severely yellowed | White, no change | Opaque | Black | White opaque. |

| Fluorinated Polyvinyl Polymer + → of Example 11 | Ex. 35 F Butane Diol Carbamate | Ex. 36 G Phosphoric Triamide | Ex. 37 H Bis-amide | Ex. 38 I Alkylene Diurea | Ex. 39 J Phosphoric Amide |
|---|---|---|---|---|---|
| Initial appearance | Clear, compatible | Clear, compatible | Clear, compatible | Compatible | Compatible. |
| Room temperature cure (2 days). | Yes | Some | Yes | Good cure | Good cure. |
| Cured at 50° C. for 16 hours. | Good cure | Good cure | Good cure | Good cure | Good cure. |
| Appearance | Clear, compatible, highly transparent, strong-rubbery. | Clear, compatible, highly transparent, strong-rubbery. | Clear, compatible, highly transparent, strong-rubbery. | Clear, transparent film. | Clear, transparent film. |
| Adhesion test to Teflon coated cloth. | Good adhesion, after curing. | Good adhesion, after curing. | Good adhesion, after curing. | Good | Good. |
| Aging: | | | | | |
| Time | 16 hours | 16 hours | 16 hours | 16 hours | 16 hours. |
| Temperature | 50° C | 50° C | 50° C | 50° C | 50° C. |
| Appearance after aging | No change, clear excellent interlayer material. | No change, clear excellent interlayer material. | No change, clear excellent interlayer material. | Clear, transparent | Clear, transparent, excellent interlayer material. |

From the results appearing in Table III it is noted that the fluorinated polyesters cured with the alkylenimine derivatives of this invention are the only products displaying good curing properties, freedom from discoloration, good adhesion properties (particularly to polytetrafluoroethylene) and good compatibility of the polymer and curing agent. Both the dissocyanate and dimercaptan systems had poor compatibility and poor curing properties, as well as poor adhesive properties due to the low cure achieved. The dicumyl peroxide system did not give an acceptable cure, and the viscosity remained approximately the same as the viscosity of the original polyester. The triethylene tetramine cure progressed satisfactorily, but adhesion to Teflon was poor and the materials could be readily and cleanly shocked off. Moreover, on continued curing at 150° C., the amine system discolored, became opaque, and lost the original transparency. The epoxy cured ssytem gave a fairly good cure but lacked the desired cohesive strength as an adhesive and discolored upon prolonged aging.

Table IV shows the superior cures and cured material obtained with a polyvinyl type polymer and the alkylenimine derivatives of this invention. Among the conventional curing agents, only triethylene tetramine was fully compatible and gave a good cure. However, this system yellowed severely upon curing, did not approach the clarity and transparency of the alkylenimine derivatives, and moreover had poor adhesion to Teflon.

The clarity and good strength of the alkylenimine derivative cured systems made possible the preparation of pressure sensitive tape by coating onto film of polyester ethylene glycol terephthalate, commonly known as "Mylar" or "Terylene." This clear, transparent tape had good appearance and displayed good "wet grab" as well as excellent adhesion to Teflon coated glass cloth.

It is also frequently desirable, when the curable polymers are in latex form, e.g. an aqueous latex, to introduce the alkylenimine derivative into the latex. This provides a fine dispersion of high solids content and low viscosity which may be readily applied even to remote areas without fine hazards or expensive equipment. After evaporation of the dispersing media the cure can be effected in situ, frequently at about room temperature. The use of water soluble alkylenimine derivatives is particularly outstanding in this application because of their excellent stability in aqueous systems. The following example illustrates this technique.

EXAMPLE 40

One hundred parts of a blended aqueous latex (pH 2) containing a 66 weight percent copolymer of 1,1-dihydroperfluorobutyl acrylate and acrylic acid (99:1 mol ratio) and 34 percent polytetrafluoroethylene was admixed with 8 parts by weight of triethylene melamine, and a portion thereof was coated onto Alcad 75 aluminum. The water was evaporated, and a tack-free film was formed after standing for a few days at room temperature. Tensile strength of such films is 200–300 p.s.i. with elongations inversely proportional to the curing agent concentration. Flexing a 25 mil film on Alcad 75 aluminum over a 4 inch diameter mandrel at −50° F. caused neither adhesive nor cohesive failure. The remaining latex mixture gelled on standing 12 hours.

Various modifications and variations in the ingredients and proportions of ingredients may be employed in the curable composition of this invention without departing from the scope of this invention. It is also understood that other equivalent fluorinated polymers and alkylenimine derivatives to those disclosed herein are within the compass of this invention.

I claim:

1. A solid cured product which is incapable of viscous flow at temperatures below about 100° C. and which is a product of (1) a substantically liquid fluorinated copolymer of an alpha-beta ethylenically unsaturated carboxylic acid and at least one terminally unsaturated aliphatic olefinic compound, said olefinic compound being at least half fluorinated and having less than 10 carbon atoms, said copolymer having from 2 to about 15 carboxyl groups per molecule, having from about 0.1 to about 3 milliequivalents of carboxyl groups per gram of copolymer, having monomer units corresponding to between about 0.1 and about 10 mol percent of said unsaturated carboxylic acid, and having a molecular weight below about 50,000, and (2) between about stoichiometric and about 70 percent excess amount, based on said fluorinated copolymer, of a compound having the formula

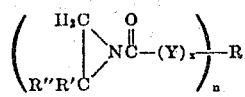

wherein Y is selected from the group consisting of oxygen and —NH—, x is selected from the group consisting of 0 and 1, R' and R" are selected from the group consisting of hydrogen and an alkyl group having from 1 to 4 carbon atoms, n is an integer from 2 to 3, and R is an active hydrogen free, n-valent radical selected from the group consisting of an aliphatic, aromatic and alicyclic radical.

2. A solid cured product which is incapable of viscous flow at temperatures below about 100° C. and which is a product of (1) a substantically liquid fluorinated copolymer of acrylic acid and an acrylate ester of a fluorinated alcohol, said copolymer having from 2 to about 15 carboxyl groups per molecule, having from about 0.1 to about 3 milliequivalents of carboxyl groups per gram of copolymer, having monomer units corresponding to between about 0.1 and about 10 mol percent of said unsaturated carboxylic acid, and having a molecular weight below about 50,000, and (2) between about stoichiometric and about 70 percent excess amount, based on said fluorinated copolymer, of a compound having the formula

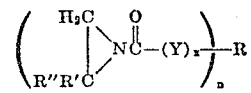

wherein Y is selected from the group consisting of oxygen and —NH—, x is selected from the group consisting of 0 and 1, R' and R" are selected from the group consisting of hydrogen and an alkyl group having from 1 to 4 carbon atoms, n is an integer from 2 to 3, and R is an active hydrogen free, n-valent radical selected from the group consisting of an aliphatic, aromatic and alicyclic radical.

3. A solid cured product which is incapable of viscous flow at temperatures below about 100° C. and which is a product of (1) a substantically liquid fluorinated copolymer of 1,1-dihydroperfluorobutyl acrylate and acrylic acid, said copolymer having from 2 to about 15 carboxyl groups per molecule, having from about 0.1 to about 3 milliequivalents of carboxyl groups per gram of copolymer, having monomer units corresponding to between about 0.1 and about 10 mol percent of said unsaturated carboxylic acid, and having a molecular weight below about 50,000 and (2) between about stoichiometric and about 70 percent excess amount, based on said fluorinated copolymer, of a compound having the formula

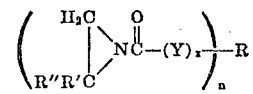

wherein Y is selected from the group consisting of oxygen and —NH—, x is selected from the group consisting of 0 and 1, R' and R" are selected from the group consisting of hydrogen and an alkyl group having from 1 to 4 carbon atoms, n is an integer from 2 to 3, and R is an active hydrogen free, n-valent radical selected from the group consisting of an aliphatic, aromatic and alicyclic radical.

4. A solid cured product which is incapable of viscous flow at temperatures below about 100° C. and which is a product of (1) a substantially liquid fluorinated copolymer of acrylic acid, perfluoropropene, and vinylidene fluoride, said copolymer having from 2 to about 15 carboxyl groups per molecule, having from about 0.1 to about 3 milliequivalents of carboxyl groups per gram of copolymer, having monomer units corresponding to between about 0.1 and about 10 mol percent of said unsaturated carboxylic acid, and having a molecular weight below about 50,000, and (2) between about stoichiometric and about 70 percent excess amount, based on said fluorinated copolymer, of a compound having the formula

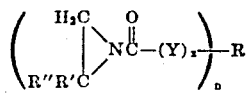

wherein Y is selected from the group consisting of oxygen and —NH—, $x$ is selected from the group consisting of 0 and 1, R' and R" are selected from the group consisting of hydrogen and an alkyl group having from 1 to 4 carbon atoms, $n$ is an integer from 2 to 3, and R is an active hydrogen free, $n$-valent radical selected from the group consisting of an aliphatic, aromatic and alicyclic radical.

5. A process which comprises admixing (1) a substantially liquid fluorinated copolymer of an alpha-beta ethylenically unsaturated carboxylic acid and at least one terminally unsaturated aliphatic olefinic compound, said olefinic compound being at least half fluorinated and having less than 10 carbon atoms, said copolymer having from 2 to about 15 carboxyl groups per molecule, having from about 0.1 to about 3 milliequivalents of carboxyl groups per gram of copolymer, having monomer units corresponding to between about 0.1 and about 10 mol percent of said unsaturated carboxylic acid, and having a molecular weight below about 50,000, and (2) between about stoichiometric and about 70 percent excess amount, based on said fluorinated copolymer, of a compound having the formula

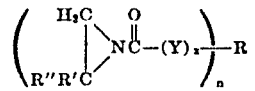

wherein Y is selected from the group consisting of oxygen and —NH—, $x$ is selected from the group consisting of 0 and 1, R' and R" are selected from the group consisting of hydrogen and an alkyl group having from 1 to 4 carbon atoms, $n$ is an integer from 2 to 3, and R is an active hydrogen free, $n$-valent radical selected from the group consisting of an aliphatic, aromatic and alicyclic radical; and curing at a temperature below about 150° C.

References Cited by the Examiner

UNITED STATES PATENTS

| | | | |
|---|---|---|---|
| 2,594,145 | 4/52 | Flory | 260—75 |
| 2,694,696 | 11/54 | Melamed | 260—75 |
| 2,867,601 | 1/59 | Landrum et al. | 260—78.5 |
| 2,915,480 | 12/59 | Reeves et al. | 260—78.4 |
| 2,933,416 | 4/60 | Haakh et al. | 260—45.4 |

FOREIGN PATENTS 900,137  12/53  Germany.

WILLIAM H. SHORT, *Primary Examiner.*

PHILIP E. MANGAN, LOUISE P. QUAST, *Examiners.*

UNITED STATES PATENT OFFICE
CERTIFICATE OF CORRECTION

Patent No. 3,198,770                                          August 3, 1965

Nathaniel L. Watkins, Jr.

It is hereby certified that error appears in the above numbered patent requiring correction and that the said Letters Patent should read as corrected below.

Column 3, line 40, for "367" read -- 397 --; column 7, lines 11 to 13, the formula should appear as shown below instead of as in the patent:

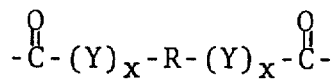

column 8, line 46, for "carbomates" read -- carbamates --; column 9, line 8, for "-propylendecanoyldicarboxylic" read ---propylendodecanoyldicarboxylic --; column 12, line 14, for "98.73:" read -- 98.75: --; column 13, line 9, for "II" read -- 11 --; columns 15 and 16, TABLE III, sixth column, line 2 thereof, for "No care" read -- No cure --.

Signed and sealed this 7th day of February 1967.

(SEAL)
Attest:

ERNEST W. SWIDER                                   EDWARD J. BRENNER
Attesting Officer                                   Commissioner of Patents